(12) United States Patent
Lukka

(10) Patent No.: US 9,713,875 B2
(45) Date of Patent: Jul. 25, 2017

(54) SHOCK TOLERANT STRUCTURE

(71) Applicant: ZENROBOTICS OY, Helsinki (FI)

(72) Inventor: Tuomas Lukka, Helsinki (FI)

(73) Assignee: ZENROBOTICS OY, Helsinki (FI)

( * ) Notice: Subject to any disclaimer, the term of this patent is extended or adjusted under 35 U.S.C. 154(b) by 259 days.

(21) Appl. No.: 14/346,349

(22) PCT Filed: Sep. 21, 2012

(86) PCT No.: PCT/FI2012/050909
§ 371 (c)(1),
(2) Date: Mar. 21, 2014

(87) PCT Pub. No.: WO2013/041773
PCT Pub. Date: Mar. 28, 2013

(65) Prior Publication Data
US 2014/0236355 A1     Aug. 21, 2014

(30) Foreign Application Priority Data

Sep. 21, 2011   (FI) .................................... 20115923

(51) Int. Cl.
*B25J 9/00* (2006.01)
*F16F 13/00* (2006.01)
(Continued)

(52) U.S. Cl.
CPC .......... *B25J 19/0091* (2013.01); *F16F 9/512* (2013.01); *F16F 13/00* (2013.01); *F16F 13/005* (2013.01); *F16F 13/24* (2013.01); *B25J 9/1694* (2013.01)

(58) Field of Classification Search
CPC .... B25J 19/0091; B25J 19/068; B25J 9/1694; B25J 17/0208; F16F 9/512; F16F 9/125;
(Continued)

(56) References Cited

U.S. PATENT DOCUMENTS 5,116,190 A    5/1992   Silke
5,445,247 A    8/1995   Sato
(Continued)

FOREIGN PATENT DOCUMENTS

CN    1291537    4/2001
CN    1651295    8/2005
(Continued)

OTHER PUBLICATIONS

Chinese Office Action, dated Apr. 3, 2015, in corresponding Chinese Patent Application No. 201280056743.X.
(Continued)

*Primary Examiner* — Abby Lin
(74) *Attorney, Agent, or Firm* — Young & Thompson

(57) ABSTRACT

The invention concerns in general the technical field of robotics and automation. Especially the invention concerns a structure for improving a shock tolerance of a robot or other positioning system. More specifically, the invention discloses a mounting element structure for increasing shock tolerance in a robot. The mounting element structure includes a first surface (201) and a second surface (202) towards a robot tool element, wherein the first and second surfaces (201; 202) are configured to be connected with a string assembly (203). The string assembly is configured to, under exposure of external force exceeding a predetermined level, to reduce the damage caused by the force by deforming the shape of the string assembly (203).

16 Claims, 4 Drawing Sheets

(51) Int. Cl.
*F16F 9/512* (2006.01)
*F16F 13/24* (2006.01)
*B25J 19/00* (2006.01)
*B25J 9/16* (2006.01)

(58) Field of Classification Search
CPC .......... F16F 13/00; F16F 13/005; F16F 13/08; F16F 13/24
USPC ............. 188/266.1, 377, 1.11 E; 267/140.11; 414/21
See application file for complete search history.

(56) References Cited

U.S. PATENT DOCUMENTS

| | | | |
|---|---|---|---|
| 5,455,497 A | 10/1995 | Hirose et al. | |
| 5,987,726 A | 11/1999 | Akeel | |
| 6,331,758 B1 | 12/2001 | Takanashi et al. | |
| 6,967,456 B2 | 11/2005 | Takenaka | |
| 7,327,112 B1 | 2/2008 | Hlynka et al. | |
| 7,650,203 B2 | 1/2010 | Maslov et al. | |
| 2002/0190230 A1* | 12/2002 | Dworkowski | B23K 26/048 250/559.38 |
| 2005/0077856 A1 | 4/2005 | Takenaka et al. | |
| 2005/0173164 A1 | 8/2005 | Maslov et al. | |
| 2007/0131213 A1 | 6/2007 | Matsuda | |
| 2011/0231018 A1* | 9/2011 | Iwai | B25J 9/1664 700/253 |

FOREIGN PATENT DOCUMENTS

| | | |
|---|---|---|
| CN | 101088720 | 12/2007 |
| CN | 101471546 | 7/2009 |
| EP | 1 466 704 | 10/2004 |
| EP | 1 810 795 | 7/2007 |
| JP | H02503404 | 10/1990 |
| JP | H4176583 | 6/1992 |
| JP | H0489687 | 8/1992 |
| JP | H1069315 | 3/1998 |
| JP | 11320461 | 11/1999 |
| JP | 2003031636 | 1/2003 |
| WO | 8908537 | 9/1989 |

OTHER PUBLICATIONS

International Search Report dated Mar. 4, 2013, corresponding to PCT/FI2012/050909.
Finnish Search Report dated Jun. 19, 2012, corresponding to the Foreign Priority Application No. 20115923.
Japanese Office Action dated Aug. 2, 2016; Application No. 2014-531283.

* cited by examiner

SHOCK TOLERANT STRUCTURE

TECHNICAL FIELD

The invention concerns in general the technical field of robotics and automation. Especially the invention concerns a structure for improving shock tolerance of a robot or other positioning system.

BACKGROUND OF THE INVENTION

Robots are widely used in different types of industrial applications, usually in such applications in which accuracy plays an important role and the same operations are continuously repeated. An example of such an operation is the manufacturing of circuit boards where the robot is equipped with an applicable gripping element, which grips the component and places it accurately to the circuit board for the next steps in the production.

The requirements for robots vary according to the environments they are used in. A specific environment is one where heavy loads are lifted and the robots are prone to shocks, like bangs and knocks, and the robots are working under unclean conditions.

One such environment is the waste industry, wherein waste is sorted e.g. from a conveyor belt. Robots are programmed to collect and recycle the waste according to characteristics of the waste. It is clear that sorting waste is not an easy task, not only due to the fact that the waste items vary in mass and shape, but also because the flow of the waste on the conveyor belt varies constantly. In this kind of sorting one requirement for robots, in addition to speed, is that the robots must not be vulnerable to shocks during the operation. The cost of idle time of an automatic waste sorting station is significant and thus it is desirable to make arrangements to minimize the effects of expected shocks during the operation.

The structure most vulnerable for shocks in robots is typically the tool, e.g. a gripper. The items on the conveyor belt vary in size and weight and may shift or roll during the operation. Collisions with items on the conveyor or the inertia of collected items may cause shocks to the robot. Furthermore, multiple robots can be deployed around the conveyor belt and two or more robots or their carried loads of unknown shape may collide for any reason, causing serious damage to the robots.

There are several prior art methods for preventing such damage to robots. Typically these are either structural arrangements such as yielding or breaking parts, or operational methods for preventing the damage, e.g. recognizing a possible collision by utilizing some sort of sensor arrangement.

In such structural arrangements parts of the robot, for example an articulated robot arm, are arranged to be at least partly flexible. This is achieved e.g. with choice of material within the arm. For example some elastic material can be arranged between two parts, e.g. an arm and a gripper, which allows the parts to bend in relation to each other in a shock situation. Another example are spring based arm solutions, which are also designed to minimize possible damage in case of shock. A third category of prior art solutions for preventing damage are structures that comprise parts which yield or break when a predetermined force is exceeded in a shock situation.

An example of operational methods for preventing damage, according to prior art solutions, are arrangements where the operation of the robot is monitored with sensors and, if a damaging situation is detected, altered to avoid damage, e.g. by stopping the robot.

One example of absorbing shocks in robotic environment is disclosed in a publication U.S. Pat. No. 7,327,112 B1. The publication discloses a tumbling robot in which a control system coordinates the action of multiple legs of the robot to cause the robot to tumble in any direction. The legs are coupled with tension wires that hold the robot in shape but also absorb the shock of the legs contacting the ground when the material of the wires is optimally selected.

Another example of suspension mechanism in the robotic area is disclosed in a publication U.S. Pat. No. 5,116,190. The publication introduces a cable suspension compliance mechanism which is to be implemented between two plates and the suspension mechanism comprises suspension cables, stiffeners and tensioning cables. It is possible to adjust the level of suspension by controlling the stiffeners. This enables the utilization of the structure in positioning of a gripping element of a robot so that an article can be optimally gripped.

Some of the drawbacks of the prior art solutions are that they are expensive to implement, e.g. detector based operational methods, or they are difficult to implement in robots which are configured to operate in challenging environments, such as waste sorting facilities. Moreover, prior art solutions based on breaking parts, e.g. clamps, cannot be used in environments, where it is basically impossible to let the whole system idle while the robot is repaired. Also, due to the complexity of the prior art solutions, the repairing takes a long time, which again is not acceptable in e.g. robotics solutions where idling of the system causes significant costs to the operator.

SUMMARY OF THE INVENTION

An objective of the invention is to present into the structure of a robot an arrangement which reduces the risk of damaging the robot even if the robot receives a shock. Furthermore, an objective of the invention is to implement into the structure of a robot an arrangement, which is rigid enough to be utilized in environments where accuracy plays an important role.

The objectives of the invention are achieved by arranging a flexible mounting element structure between a robot and a tool element. The flexible mounting element structure is achieved by arranging a string assembly between two mounting surfaces having a predetermined distance in such a manner that the structure of the mounting element structure is substantially rigid until an external force exceeding a predetermined level affects the structure and, as a result, the structure becomes at least partly flexible and thus prevents major damage to the robot.

In some embodiment of the invention an extending element is arranged between said two mounting surfaces so that the extending element when activated causes a counterforce to said string assembly and thus the whole structure becomes more rigid.

In some embodiment of the invention the extending element is a spring. In another embodiment of the invention the extending element is a hydraulic or pneumatic cylinder.

In an embodiment of the invention the shape of said first and second mounting surfaces is square, in some other embodiment the shape of said first and second mounting surfaces is triangle with cut corners.

The advantage according to the present invention is that it is a very simple arrangement and thus cheap to manufacture and repair. Additionally, the repairs are fast to accomplish and thus the idle time in case of robot damage is relatively short. The structure according to the invention also includes no hysteresis when deforming, allowing for control of the robot even in a shock situation.

The exemplary embodiments of the invention described in this patent application are not to be interpreted to pose limitations to the applicability of the appended claims. The verb "to comprise" is used in this patent application as an open limitation that does not exclude the existence of other unrecited features. The features recited in the dependent claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Below some preferred embodiments of the invention are described by referring to the figures described above.

Figure 1:
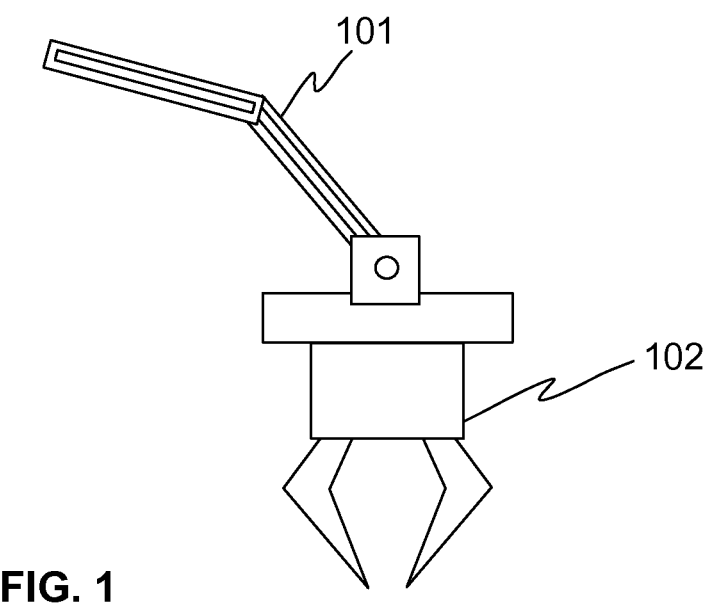
FIG. 1 illustrates a robot arm solution according to prior art.

FIG. 1 shows a generally known robot arm solution. The robot arm discloses the main parts in their broadest form, which are also relevant in the context of the current invention. The robot comprises the arm i.e. robot arm 101. In this exemplary illustration the robot arm 101 is formed from two parts, which are hinged to each other. The robot arm 101 is connected to the gripper element 102 by mounting it with a generally known joint structure, which enables, together with any hinge element in the robot arm 101, moving the gripper in 3-dimensional space. According to one common method the robot arm and its parts are controlled with a central control unit, which transmits control signals to motors of the robot so that the desired movement and gripping can be accomplished. Also, the gripper element 102 can be replaced with any tool element applicable to be utilized in robotics environments.

Figure 2A:
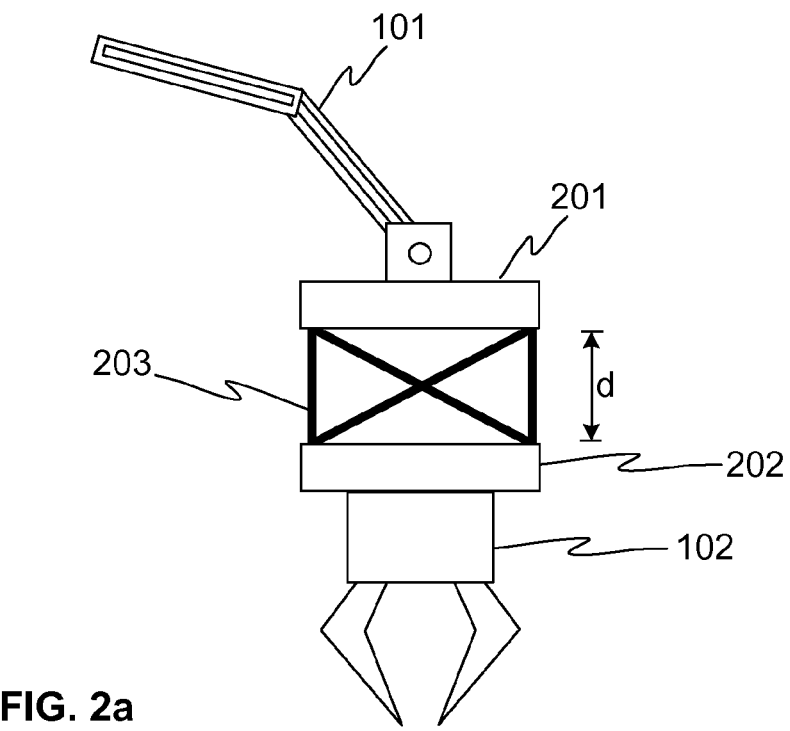
FIG. 2a-b illustrates an embodiment of the invention.

FIG. 2a shows an embodiment of the current invention, in which the robot comprises a robot arm 101 and a gripper element 102 similar to those disclosed in FIG. 1.

Further, according to the present invention between said robot arm 101 and said gripper element 102 is arranged a mounting element structure consisting of a first mounting surface 201, which is configured to be connectable with the robot arm 101. The connection can be established for example with a hinge arrangement or with a ball-and-socket joint so that the movement of the mounting surface 201 in relation to the robot arm 101 is possible 3-dimensionally. In some embodiments the mounting surface 201 is rotatable against the robot arm 101. This can be accomplished with a suitable rotating connector, such as a rotating axis or a ball and socket joint, and the necessary motors which exert the necessary force to the mounting surface 201 for achieving the rotational motion.

According to certain embodiments of the invention the mounting element structure comprises a second mounting surface 202 which is configured to be mounted to a predetermined distance d from the first mounting surface 201 by utilizing a string assembly 203. The second mounting surface provides a surface into which the gripper element 102 is connected. According to an example of the invention the gripper element 102 is fixed to the second mounting surface 202. According to some other embodiments of the invention the gripper element 102 is rotably connected to the second mounting surface 202. This can be achieved with e.g. a controllable movable bearing arrangement so that the gripper element 102 can be turned and aligned with the item to be gripped in an effective manner.

The distance between said first and said second mounting surfaces and the string geometry is advantageously selected in such a manner that the flexibility of the mounting element structure in shock situations is applicable to the need, e.g. to the weight of the gripper, the weight of the items to be gripped and moved and/or to the possible external shock forces which the robot arm 101 and/or the gripper element 102 is/are exposed to. Adjusting the distance between the mounting surfaces adjusts the amount of force which is needed to make the structure flex.

The flexibility of the structure is, generally speaking, determined by the geometry of the string assembly and the force separating the mounting surfaces. The possible velocities of the mounting surfaces relative to each other near the resting position can be thought of as a 6-dimensional space, corresponding to the 6 degrees of freedom of movement of the mounting surfaces (velocity in 3 dimensions and angular velocity in 3 dimensions). In this space, each string constitutes a 5-dimensional plane dividing the space of the possible velocities in half.

The force separating the mounting surfaces separates the surfaces until a limit in each dimension is met, causing the structure to assume a resting position. As there are 6 degrees of freedom of movement, in a stable resting position at least 6 strings are taut. The resting position can be thought to reside in a potential well shaped by the intersecting limiting planes. In order for this position to change, i.e. for a force to deform the structure in some direction, the deforming force must be strong enough to "lift" the position from the potential well.

The shape of the potential is an important aspect of the invention. A simple spring can be used as a shock tolerant structure, for which the potential is proportional to $x^2$, x denoting displacement. Such arrangements deform in a continuous fashion, i.e. any force deforms the structure at least slightly with any amount of force, making it non-rigid, wobbly and inaccurate. The potential of the arrangement according to the invention, in contrast, is proportional to |x| (absolute value of the displacement), i.e. it is "sharp" in shape. Thus, the structure is not deformed at all until the deforming force exceeds a certain threshold, making the structure rigid under normal operation. The force threshold can, depending on the geometry of the string assembly, be different in different directions and it is linearly scaled by the magnitude of the separating force.

In some embodiments of the invention the string material is assumed essentially non-elastic, i.e. the strings do not stretch but constitute rigid limits for the distances between connected mounting surface points. Hence the string material, as long as it is sufficiently non-elastic, does not affect the rigidity of the system.

An important aspect of some embodiments of the invention is that each of the strings in the string assembly is unconnected to others i.e. thus they do not form any continuous portions over the mounting points. Each of the strings is fixed to the mounting point with some common method, such as with a suitable knot and/or with a suitable fixing element.

Figure 2B:
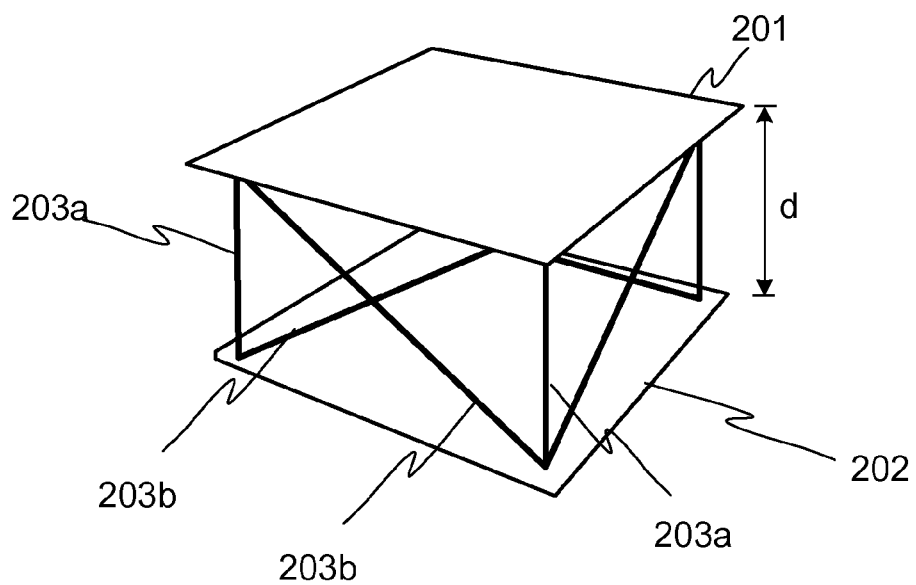

FIG. 2b shows an example of a 3-dimensional structure of the mounting element according to an embodiment of the invention. In addition to said mounting surfaces 201, 202 the mounting element structure comprises a string assembly as disclosed in FIG. 2b. Said mounting surfaces 201, 202 are connected with a string from a corner of the first mounting surface 201 to a corresponding corner in the second mounting surface 202, as disclosed with a reference 203a in FIG. 2b. Additionally, a corner of the first mounting surface 201 is connected to a corner of the second mounting surface 202 with a crossing string 203b as disclosed in FIG. 2b. The same string arrangement is arranged to every corner of the first and second mounting surfaces 201, 202. Thus, such a string assembly 203 consists of 12 string parts in total. By means of such string assembly arrangement the structure is not elastic i.e. it does not disturb the normal operation of the robot, but when an external force causes a shock to the robot and the force exceeds a predetermined level (defined with the characteristics of the string assembly) the string assembly becomes elastic, yielding to and absorbing the external force in a manner that reduces the risk of causing damage to the robot.

Even if FIG. 2b shows that the mounting surfaces 201, 202 are squares in shape, it does not limit the applicability of the invention to surfaces with other shapes.

Figure 3A:
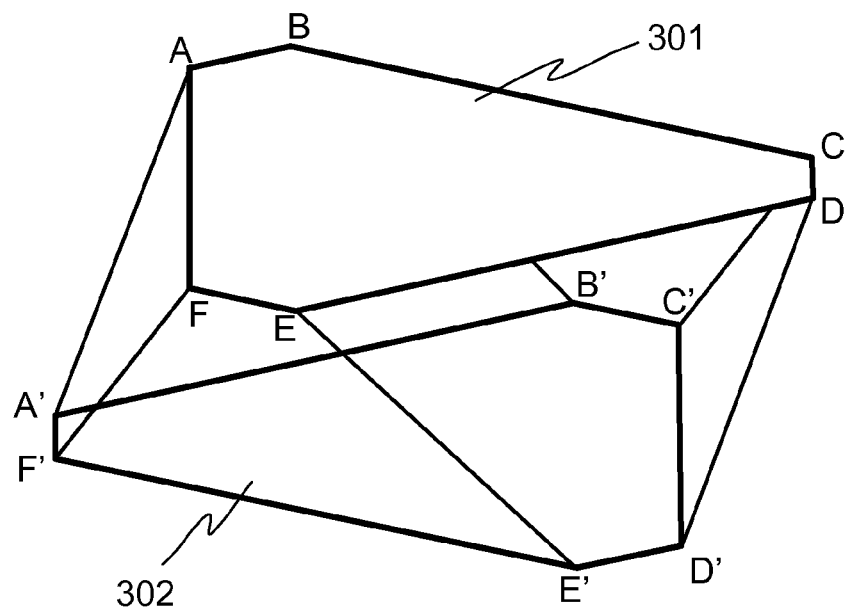
FIG. 3a-b illustrates another embodiments of the invention.

FIG. 3a discloses another example of the invention in which the mounting surfaces are shaped like triangles with the corners cut. Again, a first mounting surface 301 is connected to a second mounting surface 302 with a string assembly. The string assembly according to the embodiment of the invention is established by connecting each corner of the first mounting surface 301 with a string to a corresponding corner of the second mounting surface 302. Thus, the resulting wires in the whole string assembly according to FIG. 3a are the following: A-A', B-B', C-C', D-D', E-E', and F-F'.

Figure 3B:
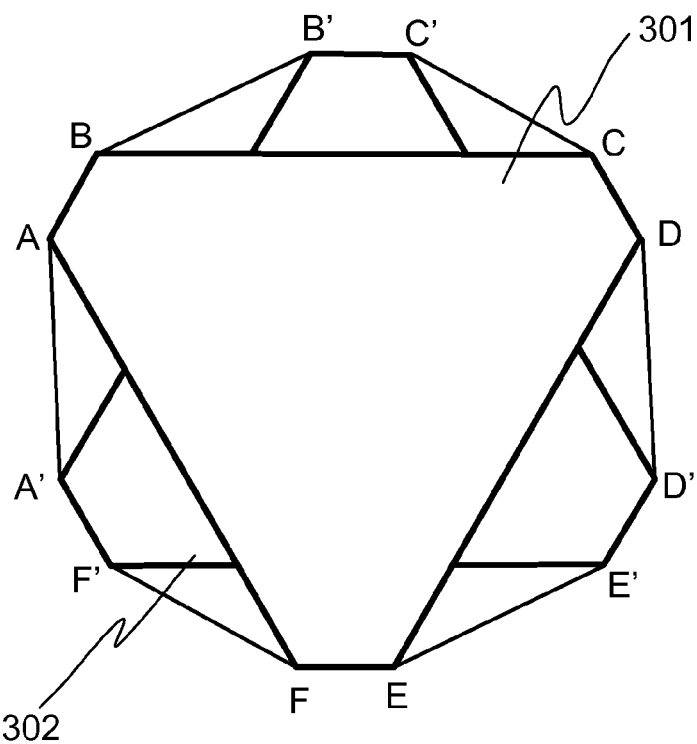

A 6-string assembly is preferred because it is the minimum number of strings needed to cover all six degrees of freedom of movement of the system. Hence there is no need to carefully tune the tightness and length of the strings, as each string is necessarily pulled taut and active in the system. According to the embodiment of the invention shown in FIG. 3a, the mounting surfaces 301, 302 are configured to be mounted in such a manner that enables interleaving of the surfaces 301, 302 at least partly during the deformation of the shape of the string assembly. This is illustrated in FIG. 3b in which the interleaving of the corners of the mounting surfaces is illustrated. The advantage of the interleaving corners is that it enables a wider range of movement of the mounting structure in a shock situation caused by an external force. In other words, when the robot receives a shock the interleaving corners of the mounting surfaces enable wider movement than e.g. in the mounting structure shown in FIGS. 2a and 2b for yielding to the shock force and as a consequence reducing the risk of damages to the robot, tool or the mounting structure even more.

Figure 4:
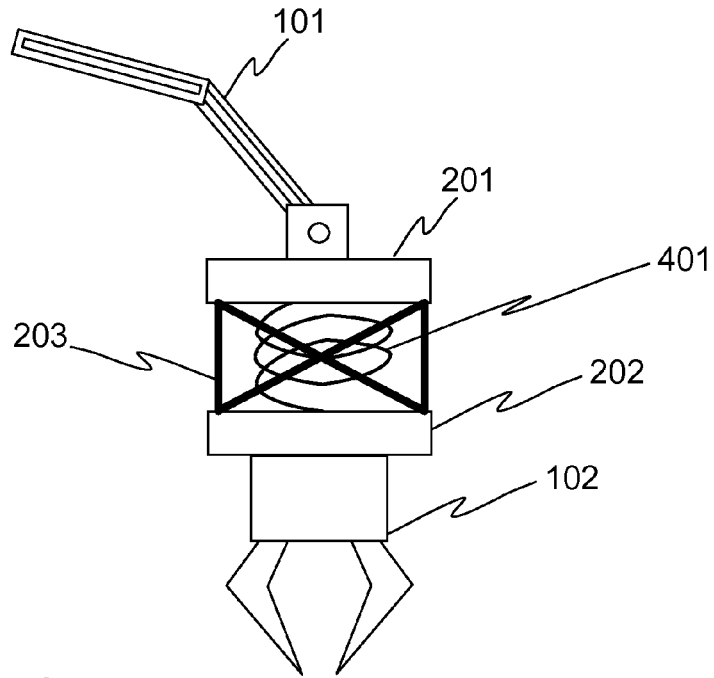
FIG. 4 illustrates a further embodiment of the invention.

Some embodiments of the invention further comprise an extending element for increasing the force keeping the first and second mounting surfaces within a predetermined distance from each other. One such embodiment of the invention is illustrated in FIG. 4. FIG. 4 illustrates a similar robot arm structure with the string assembly as already disclosed in FIG. 2. The corresponding elements are not disclosed here. Additionally to those elements, the embodiment in FIG. 4 discloses an extending element 401, which is a spring structure in this example. The spring is adjusted so that it is in active mode, i.e. stressed, when it is mounted with the string assembly between the first and second mounting surfaces. In other words the spring causes at least partly an opposing force to the force in the string assembly. The total outcome of this arrangement is that the whole mounting element structure becomes more rigid and thus the predetermined level of the force on which the shape of the string assembly deforms can be adjusted by controlling the compression force of the extending element.

One additional advantage of utilizing an extending element in the mounting structure is that the whole robot arm is operable in multiple different positions, e.g. one can turn the robot arm to point the gripper sideways or even upwards. This increases the usability of the invention in various robotics environments.

In some examples of the invention the extending element 401 is a hydraulic cylinder applying an extending force to the first and second mounting surfaces. Similar effect can be achieved with a compression spring, pneumatic cylinder, with a solenoid and/or with a servomotor adjusting screw-like extending element as well as with bellows drive or other air spring, for instance.

The extending element is advantageously positioned in the middle of the mounting structure to achieve a symmetric effect. Alternatively there are multiple extending elements, e.g. one for each of the corners of the mounting surfaces, applied in the structure. According to some embodiment of the invention, the position of the at least one extending element is selected according to the most probable yielding direction. This enables the adjustment of the predetermined level of the force needed for the string assembly to yield. In some further embodiment of the invention the extending element is integrated with the string assembly. In addition or alternatively, hydraulic or pneumatic cylinders or springs can be mounted in the place of the strings so that they form similar constraints as strings would, but can also act as the extending elements. Such mounting can include hinges, ball-and-socket joints, lengths of string or other such flexible mounting mechanisms between the ends of the extending elements and the mounting surfaces.

Figure 5:
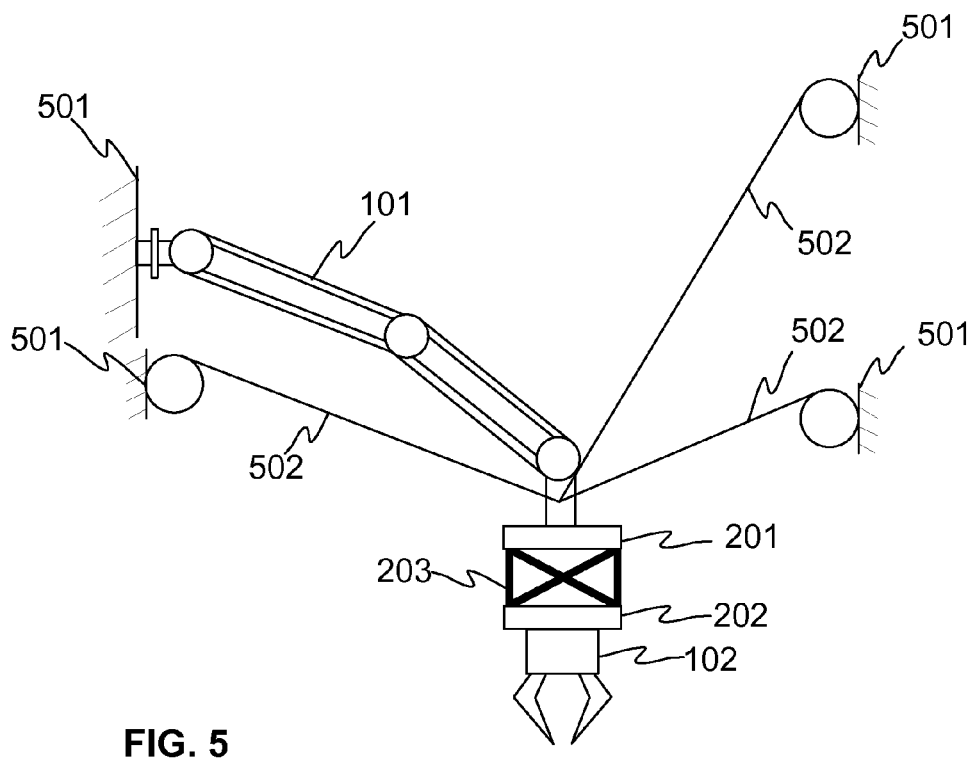
FIG. 5 illustrates a further embodiment of the invention.

Furthermore, the mounting structure can also be applied in other types of robots than robot arms. For example, a robot tool, which is controlled by means of control cables mounted in the supporting structure, like a wall, can apply the mounting element structure as illustrated in FIG. 5. FIG. 5 discloses a robot tool, like a gripper element 102, which is mounted to the supporting structure 501 with an arm 101. The control of the robot is arranged by means of controlling cables 502, which are driven with a corresponding motor, such as servo motors. Additionally, two mounting surfaces 201, 202 as well as the mounting element structure comprising a string assembly 203 as explained e.g. when discussing FIG. 2a are applied to this type of robot. Likewise the mounting structure is applicable to well known cartesian or gantry robots, or robots of other types.

Sensors can be mounted to the mounting surfaces or the strings. The sensors are connected to the system controlling the robot, typically so that the sensor values are sampled using e.g. A/D converters or other sensor interface components, which are then connected to the robot control system. Readings from sensors which measure the distance between the mounting surfaces can be used to monitor the alignment of the structure. The control system can then be configured to e.g. halt the system and/or generate a fault signal to avoid damage to the robot. The control system can also utilize the sensor readings to calculate an accurate gripping position by taking the position of the gripper into account, or to plan or make in real time more accurate movements after the gripping of an object. The sensor readings can also be used to calculate the weight of a gripped object. The sensors can be for example infrared distance sensors, cameras, encoders or sensors monitoring the pressure inside hydraulic or pneumatic cylinders or air springs acting as the extending element(s) or the strings, as described above. Sensors measuring the forces affecting the strings or the mounting surfaces can also be used in the same fashion. Such sensors can be for example strain gauges or spring equipped potentiometers.

In some embodiments of the invention it is possible to adjust the alignment of the mounting surfaces by controlling the length of the corresponding strings so that optimal alignment is achieved. Such a solution may need one or more motors to be utilized when aligning the surfaces. One such solution includes adjustable screws such as rigging or turnbuckle screws.

According to certain embodiments of the invention the string assembly is connected directly to the surface of a robot arm and/or to the surface of the gripper element without any specific mounting surfaces. Moreover, even if it is disclosed in the embodiments explained above that the first mounting surface is mounted towards a robot arm, the mounting can be done in some other ways. For example, a necessary number of wires can be connected to the first mounting surface, the wires being controlled by e.g. servomotors, in order to achieve an applicable movement controlling system to the gripper.

The term string in this context does not limit the material or form of it in any manner. The string, as such, can be considered to be a rope, a wire cable, belt or similar, which has applicable characteristics to be utilized in applications as described here. A cylindrical or tubular sock-like structure made of the string material can be used as the string arrangement by attaching the rims at each end of the cylindrical structure to each mounting surface; the structure then acts as a string assembly with a large number of almost parallel strings. Advantageously the string material is non-elastic, i.e. it does not stretch substantially when the external force is causing a deformation of the shape of the string assembly. Also, durability is an important general requirement for the string material to be applied in robots used in waste sorting.

In the embodiments disclosed here it is illustrated that the mounting structure according to the invention is applied between the robot arm and the gripper. In other embodiments of the invention the mounting structure can be fixed to other parts of the robots, for example between two arm elements of the robot. The choice of the location of the mounting structure can e.g. be based on experiments to figure out which part of the robot is most vulnerable to external shocks and/or which position of the mounting structure gives the best protection against damages to the robot arm. Moreover, the application of the invention is not limited to gripper element only, as the invention is applicable in any type of robot tool existing. Examples of the tools include magnets for gripping magnetic material and/or specific tools for specific needs, e.g. a cutter tool.

The invention claimed is:

1. A mounting element structure for increasing shock tolerance in a robot comprising a robot tool element mounted on a controllable unit, wherein the mounting element structure, which is configured to be mounted within the controllable unit, comprises:
   a first surface; and
   a second surface towards the robot tool element,
   wherein said first and second surfaces are connected with a string assembly consisting of a plurality of strings that establish rigid limits for distances between connecting points on the first and second surfaces, and
   wherein the strings of the string assembly are arranged so that the string assembly has a geometry that is substantially rigid under exposure to a non-zero external force below a predetermined level defined at least in part by the geometry of the string assembly,
   wherein some of the strings of the plurality of strings are not parallel to each other between the first and second surfaces under exposure to the non-zero external force below the predetermined level, and
   wherein increasing an external force from below the predetermined level to more than the predetermined level causes the geometry of the string assembly to transition from being substantially rigid to flexible to reduce damage caused by the external force.

2. The mounting element structure according to claim 1, further comprising at least one extending element for adjusting the predetermined level.

3. The mounting element structure according to claim 2, wherein adjustment of the predetermined level is achieved by controlling a compression force of the at least one extending element.

4. The mounting element structure according to claim 3, wherein the extending element is at least one of the following: a spring, a hydraulic cylinder, a pneumatic cylinder, a solenoid, a servomotor adjusted screw-like extending element, and an air spring.

5. The mounting element structure according to claim 2, wherein the at least one extending element is at least one of the following: a spring, a hydraulic cylinder, a pneumatic cylinder, a solenoid, a servomotor adjusted screw-like extending element, and an air spring.

6. The mounting element structure according to claim 2, wherein the at least one extending element is integrated with the string assembly.

7. The mounting element structure according to claim 1, wherein the first and second surfaces are configured to interleave at least partly during deformation of the shape of the string assembly.

8. The mounting element structure according to claim 1, wherein each of the strings forming the string assembly is tautly adjusted.

9. The mounting element structure according to claim 8, wherein each of the strings in the string assembly is mounted to the first and second surfaces.

10. The mounting element structure according to claim 1, wherein the strings in the string assembly are unconnected to each other.

11. The mounting element structure according to claim 10, wherein each of the strings in the string assembly is mounted to the first and second surfaces.

12. The mounting element structure according to claim 1, wherein the string assembly consists of six strings.

13. The mounting element structure according to claim 1, further comprises at least one sensor for monitoring alignment of the structure.

14. The mounting element structure according to claim 13, wherein the at least one sensor is a laser or infrared distance sensor, a camera, an encoder, a strain gauge, a potentiometer or a sensor monitoring pressure inside a hydraulic or pneumatic cylinder or air spring.

15. The mounting element structure according to claim 14, wherein a fault signal is configured to be generated based on the alignment of the structure measured by the at least one sensor.

16. The mounting element structure according to claim 13, wherein a fault signal is configured to be generated based on the alignment of the structure measured by the at least one sensor.

* * * * *